United States Patent
Kageshima

[11] Patent Number: 6,096,089
[45] Date of Patent: Aug. 1, 2000

[54] POWER SIMULATION SYSTEM, POWER SIMULATION METHOD AND COMPUTER-READABLE RECORDING MEDIUM FOR RECORDING POWER SIMULATION PROGRAM

[75] Inventor: Atsushi Kageshima, Kanagawa-ken, Japan

[73] Assignee: Kabushiki Kaisha Toshiba, Kawasaki, Japan

[21] Appl. No.: 09/003,123

[22] Filed: Jan. 6, 1998

[30] Foreign Application Priority Data

Jan. 8, 1997 [JP] Japan .................................. 9-001683
Oct. 15, 1997 [JP] Japan .................................. 9-282378

[51] Int. Cl.[7] .............................. G06F 17/50; G06G 7/54
[52] U.S. Cl. ............................ 703/18; 703/2; 703/22; 713/320; 713/340
[58] Field of Search ..................... 395/500.34, 500.23, 395/500.43; 713/320, 321, 322, 323, 324, 340; 703/2, 18, 22

[56] References Cited

U.S. PATENT DOCUMENTS

| | | | |
|---|---|---|---|
| 5,515,302 | 5/1996 | Horr et al. | 358/1.15 |
| 5,557,557 | 9/1996 | Frantz et al. | 395/500.43 |
| 5,666,537 | 9/1997 | Debnath et al. | 713/322 |
| 5,719,800 | 2/1998 | Mittal et al. | 713/321 |
| 5,941,991 | 8/1999 | Kageshima | 713/340 |

*Primary Examiner*—Kevin J. Teska
*Assistant Examiner*—Samuel Broda
*Attorney, Agent, or Firm*—Foley & Lardner

[57] ABSTRACT

A power simulation system comprises a tracing unit for receiving an instruction sequence of an object program and generating trace information of the object program, a stall information detecting unit for receiving the trace information generated by the tracing unit and then detecting stall information of the object program, and a power consumption calculating unit for calculating a power consumption value required for the object program based on a power consumption library with regard to the stall information by use of the stall information detected by the stall information detecting unit, whereby power information with regard to stall can be obtained.

20 Claims, 21 Drawing Sheets

FIG.6

| INSTRUCTION | NO CHANGE IN SEQUENCE | | CHANGE IN SEQUENCE | |
|---|---|---|---|---|
| | MEMORY | CACHE | MEMORY | CACHE |
| Load | 1600 | 400 | — | — |
| add | 1300 | 500 | — | — |
| mult | 1800 | 900 | — | — |
| bne | 1200 | 600 | 1400 | 800 |
| store | 2400 | 1000 | — | — |

FIG.7

| INSTRUCTION ADDRESS | INSTRUCTION |
|---|---|
| 1 | Load r1, 100 |
| 2 | Load r2, 5 |
| 3 | Load r3, 4 |
| 4 | Load r4, 1 |
| 5 | add r5, r2, r1 |
| | Start: |
| 6 | mult r5, r5, r5 |
| 7 | add r4, r4, 1 |
| 8 | bne r3, r4, Start |
| 9 | mult r6, r1, r5 |
| 10 | store r6, 0x01 |

FIG.8

| SEQUENCE | INSTRUCTION ADRS. | INSTRUCTION |
|---:|---:|---|
| 1 | 1 | Load r1, 100 |
| 2 | 2 | Load r2, 5 |
| 3 | 3 | Load r3, 4 |
| 4 | 4 | Load r4, 1 |
| 5 | 5 | add r5, r2, r1 |
| 6 | 6 | mult r5, r5, r5 |
| 7 | 7 | add r4, r4, 1 |
| 8 | 8 | bne r3, r4, Start |
| 9 | 6 | mult r5, r5, r5 |
| 10 | 7 | add r4, r4, 1 |
| 11 | 8 | bne r3, r4, Start |
| 12 | 6 | mult r5, r5, r5 |
| 13 | 7 | add r4, r4, 1 |
| 14 | 8 | bne r3, r4, Start |
| 15 | 9 | mult r6, r1, r5 |
| 16 | 10 | store r6, 0x01 |

FIG.10

| INSTRUCTION ADRS. | INSTRUCTION | MEMORY ACCESS | CACHE ACCESS | CHANGE IN SEQUENCE |
|---|---|:---:|:---:|:---:|
| 1 | Load r1, 100 | ● | | |
| 2 | Load r2, 5 | ● | | |
| 3 | Load r3, 4 | ● | | |
| 4 | Load r4, 1 | ● | | |
| 5 | add r5, r2, r1 | ● | | |
| 6 | mult r5, r5, r5 | ● | | |
| 7 | add r4, r4, 1 | ● | | |
| 8 | bne r3, r4, Start | ● | | ● |
| 6 | mult r5, r5, r5 | | ● | |
| 7 | add r4, r4, 1 | | ● | |
| 8 | bne r3, r4, Start | | ● | ● |
| 6 | mult r5, r5, r5 | | ● | |
| 7 | add r4, r4, 1 | | ● | |
| 8 | bne r3, r4, Start | | ● | |
| 9 | mult r6, r1, r5 | ● | | |
| 10 | store r6, 0x01 | ● | | |

| INSTRUCTION | MEMORY ACCESS | CACHE ACCESS | CHANGE IN SEQUENCE | POWER CONSUMPTION VALUE |
|---|---|---|---|---|
| Load r1, 100 | ● | | | 1600 |
| Load r2, 5 | ● | | | 1600 |
| Load r3, 4 | ● | | | 1600 |
| Load r4, 1 | ● | | | 1600 |
| add   r5, r2, r1 | ● | | | 1300 |
| mult  r5, r5, r5 | ● | | | 1800 |
| add   r4, r4, 1 | ● | | | 1300 |
| bne   r3, r4, Start | ● | | | 1400 |
| mult  r5, r5, r5 | | ● | | 900 |
| add   r4, r4, 1 | | ● | | 500 |
| bne   r3, r4, Start | | ● | ● | 800 |
| mult  r5, r5, r5 | | ● | | 900 |
| add   r4, r4, 1 | | ● | | 500 |
| bne   r3, r4, Start | | ● | ● | 600 |
| mult  r6, r1, r5 | ● | | | 1800 |
| store r6, 0x01 | ● | | | 2400 |
| TOTAL | | | | 20600 |

|  | I-MEMORY ACCESS | | I-CACHE ACCESS | |
|---|---|---|---|---|
| INSTRUCTION | D-MEMORY ACCESS | D-CACHE ACCESS | D-MEMORY ACCESS | D-CACHE ACCESS |
| load | 1600 | 1500 | 400 | 350 |

FIG.15

|  | I-MEMORY ACCESS | | I-CACHE ACCESS | |
|---|---|---|---|---|
| INSTRUCTION | DATA-DEPENDENT STALL | NO DATA-DEPENDENT STALL | DATA-DEPENDENT STALL | NO DATA-DEPENDENT STALL |
| add | 1450 | 1300 | 600 | 500 |

FIG.16

| INSTRUCTION | I-MEMORY ACCESS AND STALL CAUSED BY CHANGE IN SEQUENCE | INSTRUCTION MEMORY ACCESS | INSTRUCTION CACHE ACCESS |
|---|---|---|---|
| bne | 1400 | 1200 | 600 |

FIG.17

|  | I-MEMORY ACCESS | | I-CACHE ACCESS | |
|---|---|---|---|---|
| INSTRUCTION | RESOURCE CONFLICT | NO RESOURCE CONFLICT | RESOURCE CONFLICT | NO RESOURCE CONFLICT |
| mult | 2000 | 1800 | 1000 | 900 |

FIG.18

INCREASED POWER CONSUMPTION CORRECTED VALUE CAUSED BY RESOURCE CONFLICT IN "mult"=150mW

FIG.19

| INSTRUCTION ADRS. | INSTRUCTION |
|---|---|
| 1 | Load r1, 0x01(r30) |
| 2 | Load r2, 0x01(r30) |
| 3 | Load r3, 0x02(r30) |
| | Start: |
| 4 | Load r4, 0x03(r30) |
| 5 | add r5, r2, r4 |
| 6 | mult r6, r2, r5 |
| 7 | mult r7, r2, r4 |
| | Restart: |
| 8 | add r2, r1, r2 |
| 9 | bne r2, r4, Start |
| 10 | Load r2, 0x01 (r30) |
| 11 | bne r7, r3, Restart |
| 12 | mult r8, r6, r7 |

FIG.20

| SEQUENCE | INSTRUCTION ADRS. | INSTRUCTION |
|---|---|---|
| 1 | 1 | Load r1, 0x01 (r30) |
| 2 | 2 | Load r2, 0x01 (r30) |
| 3 | 3 | Load r3, 0x02 (r30) |
| 4 | 4 | Load r4, 0x03 (r30) |
| 5 | 5 | add r5, r2, r4 |
| 6 | 6 | mult r6, r2, r5 |
| 7 | 7 | mult r7, r2, r4 |
| 8 | 8 | add r2, r1, r2 |
| 9 | 9 | bne r2, r4, Start |
| 10 | 4 | Load r4, 0x03 (r30) |
| 11 | 5 | add r5, r2, r4 |
| 12 | 6 | mult r6, r2, r5 |
| 13 | 7 | mult r7, r2, r4 |
| 14 | 8 | add r2, r1, r2 |
| 15 | 9 | bne r2, r4, Start |
| 16 | 10 | Load r7, 0x01 (r30) |
| 17 | 11 | bne r2, r3, Restart |
| 18 | 12 | mult r8, r6, r7 |

FIG.27

| INSTRUCTION | STATE | OCCUR-RENCE | POWER CONSUMPTION VALUE | INCREASED CLOCK NUMBER |
|---|---|---|---|---|
| load | LOAD FROM I-CACHE AND DATA FROM D-CACHE | 1 | 350 | 0 |
|  | LOAD FROM I-CACHE AND DATA FROM MEMORY | 0 | 0 | 1 |
|  | LOAD FROM MEMORY AND DATA FROM D-CACHE | 2 | 3000 | 1 |
|  | LOAD FROM MEMORY AND DATA FROM MEMORY | 3 | 4800 | 2 |
| mult | LOAD FROM I-CACHE AND DATA-DEPENDENT STALL | 1 | 1000 | 1 |
|  | LOAD FROM I-CACHE AND NO DATA-DEPENDENT STALL | 1 | 900 | 0 |
|  | LOAD FROM MEMORY AND DATA-DEPENDENT STALL | 2 | 2000 | 2 |
|  | LOAD FROM MEMORY AND NO DATA-DEPENDENT STALL | 1 | 1800 | 1 |
|  | NUMBER OF RESOURCE CONFLICT | 1 | 150 | 1 |
| add | LOAD FROM I-CACHE AND DATA-DEPENDENT STALL | 1 | 600 | 1 |
|  | LOAD FROM I-CACHE AND NO DATA-DEPENDENT STALL | 1 | 500 | 0 |
|  | LOAD FROM MEMORY AND DATA-DEPENDENT STALL | 1 | 1450 | 2 |
|  | LOAD FROM MEMORY AND NO DATA-DEPENDENT STALL | 1 | 1300 | 1 |
| bne | LOAD FROM I-CACHE | 1 | 600 | 0 |
|  | LOAD FROM MEMORY AND NO EXECUTION CHANGE STALL | 1 | 1200 | 1 |
|  | LOAD FROM MEMORY AND EXECUTION CHANGE STALL | 1 | 1400 | 2 |
| TOTAL |  | 19 | 21050 | 16 |

POWER SIMULATION SYSTEM, POWER SIMULATION METHOD AND COMPUTER-READABLE RECORDING MEDIUM FOR RECORDING POWER SIMULATION PROGRAM

BACKGROUND OF THE INVENTION

1. Field of the Invention

The present invention relates to a power simulation system, a power simulation method, and a computer-readable recording medium for a recording power simulation program and, more particularly, a technology capable of implementing high precision power simulation while maintaining a processing speed of simulation at considerably high level.

2. Description of the Related Art

In the event that a package used for a processor is selected or a battery capacity is selected, there is necessity of calculating a power value consumed in the processor (power consumption value). As means for calculating the power consumption, such a technology has been known that the processor is supposed virtually and then a power consumption value required when a program to be executed by a processor (object program) is executed is calculated according to simulation. As simulation calculating the power consumption value (power simulation), two techniques have been disclosed as follows.

FIG. 1 is a block diagram showing a power simulation system according to a first related art. The power simulation system comprises a tracer 3 for receiving an instruction sequence of the object program 1 executed by the processor and then generating trace information 5, and a power calculator 27 for receiving the trace information 5 and then calculating power information 29 as a power consumption value per instruction by use of power consumption library per instruction 25.

In the first related art, only the trace information 5 of the object program 1 has been considered to achieve high speed simulation. More particularly, a consumption power value per instruction is calculated in advance and are prepared as a library. Power consumption values are calculated with the use of library data which correspond to execution instructions obtained by the tracer 3. In the simulation process using the above configuration, a processing time of simulation has been able to be shortened extremely but there has been a drawback that considerable error is caused to thus result in low precision simulation since only one power consumption library is prepared every instruction. In particular, such error has been further increased in recent complicated microprocessor.

FIG. 2 is a block diagram showing a power simulation system according to a second related art. This power simulation system comprises a signal converter 31 for converting the object program 1 into signal values when the object program 1 is executed by the actual processor to generate gate level input signal values 33, and a gate level simulator 35 for receiving the gate level input signal values 33 generated and then generating high precision power information 37 by executing simulation at gate level.

In the second related art, the object program at instruction level is converted automatically into signal values when such object program is executed by the actual processor. Power consumption is calculated by executing simulation while operating actually an inside of the processor at lower gate level. With this power simulation system, since simulation can be executed with implementing precisely an operation in the processor at lower level such as gate level, the simulation result can be achieved with high precision. However, there has been a drawback that a enormous processing time is required for the execution of simulation so that it takes a lot of time to execute such power simulation.

As stated above, according to the power simulation system according to the first related art, there has been such a drawback that, although the processing time of simulation can be reduced extremely, considerable error is caused to thus result in low precision simulation since only one power consumption library is prepared every instruction. In addition, according to the power simulation system according to the second related art, there has been such a drawback that, although the simulation result can be achieved with high precision, the enormous processing time is required for the execution of simulation so that it requires a lot of time to execute such power simulation.

SUMMARY OF THE INVENTION

The present invention has been made in light of the above circumstances and it is an object of the present invention to provide a power simulation system, a power simulation method, and a computer-readable recording medium for a recording power simulation program, capable of implementing power simulation with high precision while maintaining a processing speed of simulation at considerably high level.

Inventors of the present invention have considered to overcome the drawback, i.e., low precision simulation, in the power simulation system according to the first related art. As a result, it has been found that error in power consumption occurs remarkably when the processor is put into stall due to any reason.

Here a term "stall" will be explained hereinbelow. For instance, there are cases where the object program is stored in a storing device which takes several clocks to load the instructions, the execution of the processor is delayed for several clocks when the processor cannot execute the instructions because of dependence between the instructions, etc. In this manner, the "stall" is defined as a state that the processor cannot execute instructions because of delay generated by any reason. In more detail, such situations are included in the stall that so-called stall (for example, delay generated when much time is required to read out the next instruction from the memory), hazard (for example, delay generated when the instruction cannot be executed until an execution content of the previous instruction is defined since the execution content of the next instruction is changed based on an execution result of previous instruction), and resource conflict (i.e., delay generated when the instruction execution with the use of limited resources which are needed to execute plural instructions cannot be started until the previous instruction has been terminated since such limited resources are still in use by the previous instruction).

Therefore, in the case that the processor is put into the stall because of any reason, several system clocks are used excessively. Then it has been found that, since power consumption is caused to some extent during several cycles of such excessive system clocks, error in power consumption is produced.

The inventors of the present invention have found that, if power consumption simulation is carried out with considering whether or not the processor is put into the stall, high precision power simulation can be accomplished while keeping a processing speed of simulation at considerably high level so that the above drawbacks can be overcome simultaneously. As the result of careful studies, the inventors of the present invention have been able to accomplish present inventions described in the following.

As the preferred embodiment of the present invention, as shown in FIG. 3, there is provided a power simulation system for calculating, according to simulation, a power consumption value required when instructions included in an object program to be executed by a processor are executed, comprising a storing unit storing at least two power consumption values for each instruction according to whether or not the processor is put into a stall; and a calculator calculating a power consumption value consumed in the processor by use of the at least two power consumption values.

In the present invention, in view of the different power consumption according to whether or not the processor is put into stall, plural power consumption values are prepared and power consumption values in the processor can be detected by use of such plural power consumption values. Likewise, since power consumption can be calculated by use of plural power consumption values every instruction according to whether or not the processor is put into stall, high precision power simulation can be carried out while keeping a processing speed at a considerable level.

As the preferred embodiment of the present invention, as shown in FIG. 3, there is provided a power simulation system for calculating, according to simulation, a power consumption value required when instructions included in an object program to be executed by a processor are executed, comprising a tracer receiving the object program, and then generating trace information of the object program; a stall information detector receiving the trace information generated by the tracer, and then detecting stall information of the object program; and a power consumption calculator calculating a power consumption value required for the object program based on a power consumption library with regard to the stall information by use of the stall information detected by the stall information detector.

Accordingly, since power simulation can be carried out with regard to stall information, high precision simulation results can be derived.

Preferably, the stall information detector receives the trace information generated by the tracer, and then detects the stall information of the object program by use of operation information of the processor which is subject to power simulation, the operation information being stored by the processor operation information storing unit.

In this fashion, since the stall information is detected by use of processor operation information, power simulation in plural types of processors can be implemented by changing the processor operation information.

Preferably, the power consumption calculator calculates power consumption by use of library data of power consumption values which are prepared for all states which appear upon executing the object program.

In this fashion, since power consumption is calculated by use of library data of power consumption values prepared for all states when the object program is executed, power simulation in plural types of processors can be implemented by changing the library data of power consumption values.

As the preferred embodiment of the present invention, as shown in FIG. 4, there is provided a power simulation system for calculating, according to simulation, a power consumption value in a computer system which includes a processor for executing a predetermined object program, a memory for storing the predetermined object program, and an instruction cache for storing a part of the predetermined object program, the power simulation system comprising a tracer receiving the object program, and then generating trace information of the object program; a stall information detector receiving the trace information generated by the tracer, and then detecting stall information including information indicating in which memory of the memory and the instruction cache the object program is stored; and a power consumption calculator calculating a power consumption value required for the object program based on a power consumption library with regard to the stall information including consumption power when the object program is stored in the memory and consumption power when the object program is stored in the instruction cache, by use of the stall information detected by the stall information detector.

The present invention takes note of the stall caused by cache miss, i.e., the stall generated when a predetermined instruction cannot be stored in the instruction cache and is still stored in the memory. In general, this stall is generated in case the object instruction, etc. has been stored in the memory when such object instruction, etc. are loaded. Hence, with the above configuration of the present invention, since error in power consumption generated when the stall is generated at the time of cache miss can be reduced, high precision power simulation can be effected.

Preferably, the stall information detector receives the trace information generated by the tracer, and then detects the stall information both including information indicating in which memory of the memory and the instruction cache the object program is stored and information indicating whether or not the object program is subject to change in instruction sequence.

The present invention can also detect information whether or not change in instruction sequence is caused. Here the instruction to cause change in instruction sequence includes conditional branch instruction, and unconditional branch instruction. Since the stall is generated when change in instruction sequence happens, error in power consumption is caused. Therefore, higher precision power simulation can be carried out.

As the preferred embodiment of the present invention, there is provided a power simulation method of calculating, according to simulation, a power consumption value required when instructions included in an object program to be executed by a processor are executed, comprising the steps of receiving the object program, and then generating trace information of the object program; receiving the trace information generated, and then detecting stall information of the object program; and calculating a power consumption value required for the object program based on a power consumption library with regard to the stall information by use of the stall information detected.

In order to achieve the above object, as the preferred embodiment of the present invention, there is provided a computer-readable recording medium for storing a power simulation program used to calculate, according to simulation, a power consumption value required when instructions included in an object program to be executed by a processor are executed, comprising first instruction causing a computer to store at least two power consumption values for every instruction according to whether or not the processor is put into a stall; and second instruction causing the computer to calculate a power consumption value consumed in the processor by use of the at least two power consumption values.

BRIEF DESCRIPTION OF DRAWINGS

FIG. 6 is a table showing a power consumption library data with regard to stall in the computer system for use in the power simulation system according to the first embodiment of the present invention;

FIG. 7 is a table showing an instruction sequence in the object program input into the processor as a power simulation object for use in the power simulation system according to the first embodiment of the present invention;

FIG. 8 is a table showing trace information of the object program shown in FIG. 7, which is calculated by a tracer shown in FIG. 3;

FIG. 10 is a table showing trace information with regard to stall obtained by the stall information detecting algorithm shown in FIG. 9;

FIG. 11 is a table showing power information with regard to stall for use in the power simulation system according to the first embodiment of the present invention;

FIG. 14 is a table showing power consumption library data for Load instruction for use in the power simulation system according to the third embodiment of the present invention;

FIG. 15 is a table showing power consumption library data for Add instruction for use in the power simulation system according to the third embodiment of the present invention;

FIG. 16 is a table showing power consumption library data for Bne instruction for use in the power simulation system according to the third embodiment of the present invention;

FIG. 17 is a table showing power consumption library data for Mult instruction for use in the power simulation system according to the third embodiment of the present invention;

FIG. 18 is a table showing power consumption library data with respect to the Mult instruction for use in the power simulation system according to the third embodiment of the present invention;

FIG. 19 is a table showing an instruction sequence in the object program input into the processor as a power simulation object for use in the power simulation system according to the third embodiment of the present invention;

FIG. 20 is a table showing trace information of the object program shown in FIG. 19, which is calculated by the tracer shown in FIG. 3;

FIG. 27 is a table showing power information with regard to stall for use in the power simulation system according to the third embodiment of the present invention.

DETAILED DESCRIPTION OF PREFERRED EMBODIMENTS

Figure 1:
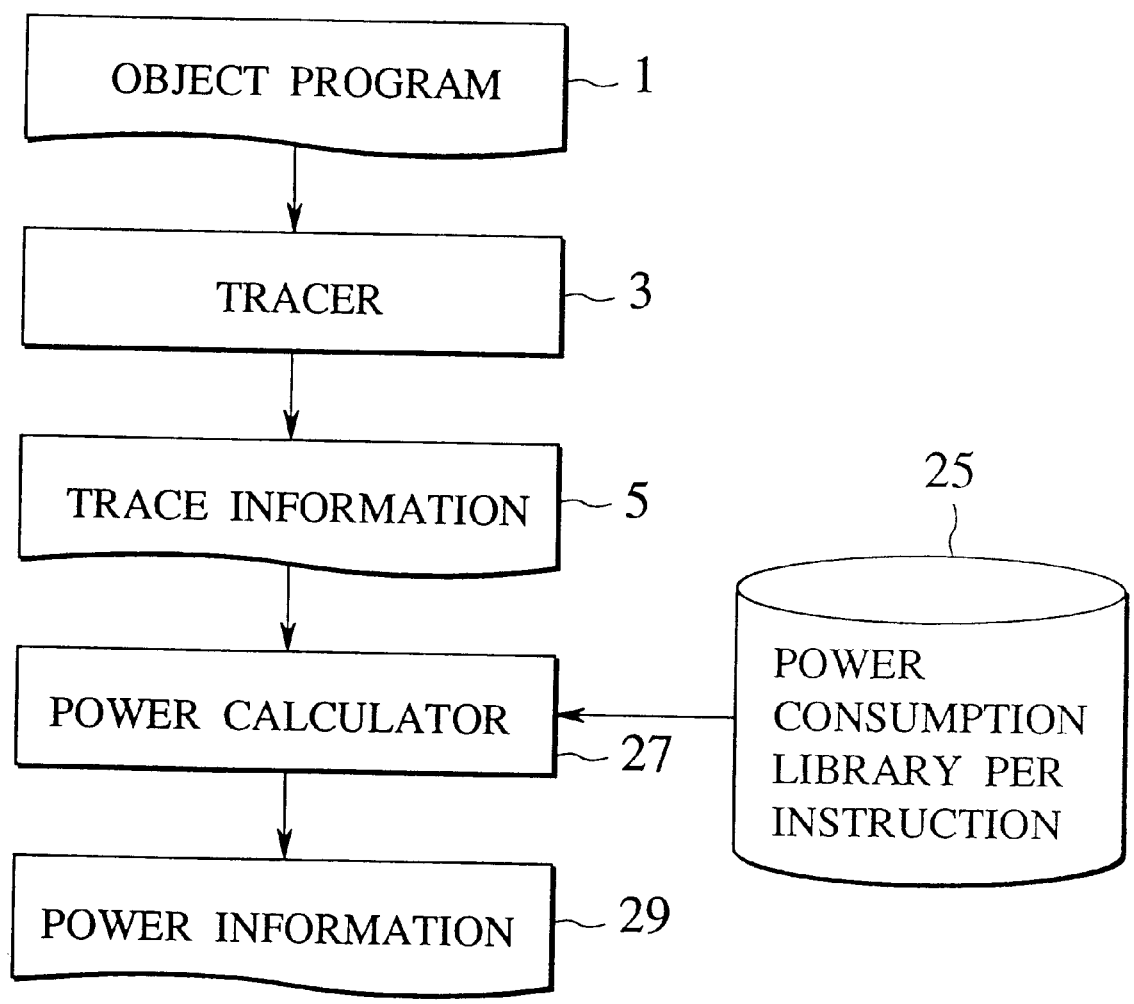
FIG. 1 is a block diagram showing a high speed power simulation system according to a first related art.
Figure 2:
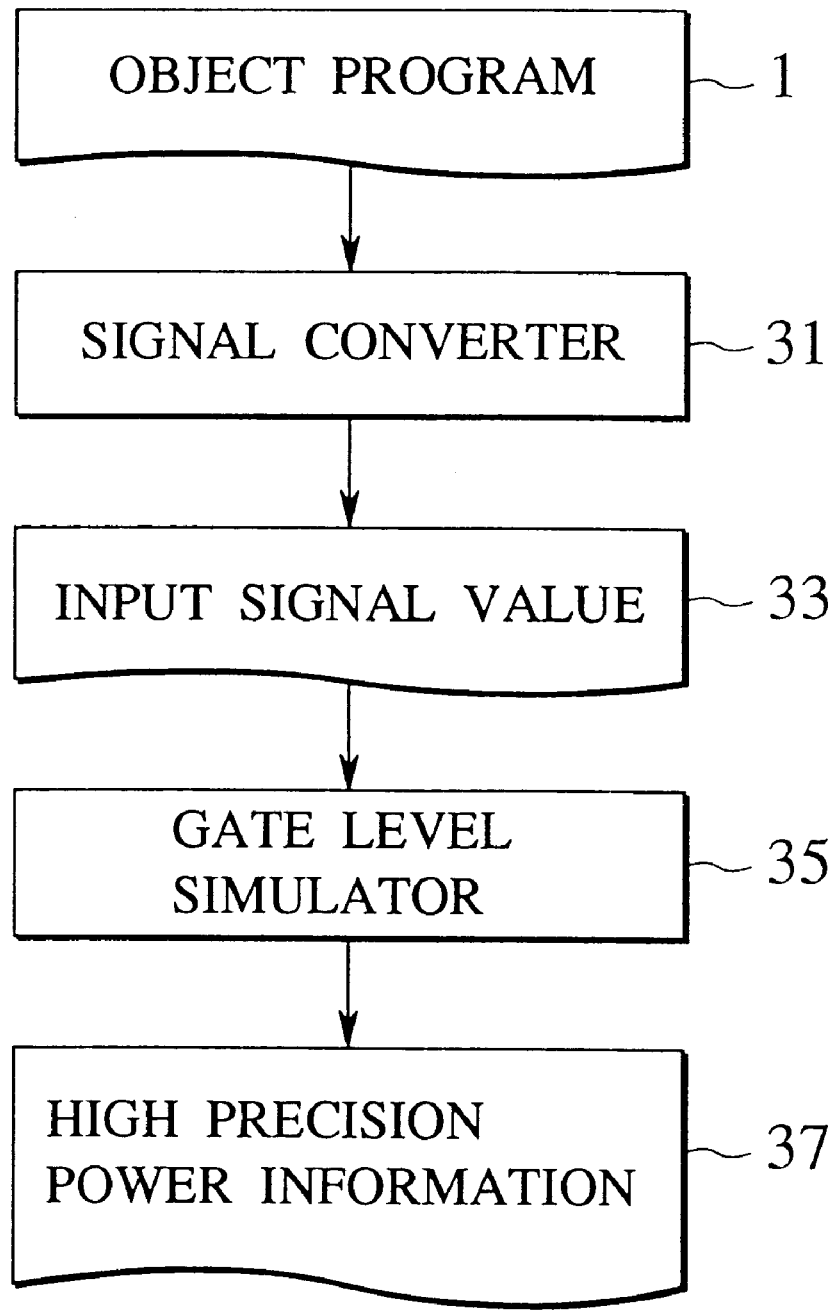
FIG. 2 is a block diagram showing a high precision power simulation system according to a second related art.

Various embodiments of the present invention will be described with reference to the accompanying drawings hereinafter. It is to be noted that same or similar reference numerals are applied to the same or similar parts or elements throughout the drawings, and the description of the same or similar parts or elements will be omitted or simplified.

As a hardware configuration of a power simulation system according to the present invention, a common computer system may be employed which includes a CPU for executing various processes, input devices such as keyboard, mouse, light pen, flexible disc drive, etc., external memory devices such as memory device, hard disc drive, etc., output devices such as display device, printer, etc. and the like. In addition, the CPU comprises an arithmetic section for executing processes to be described later, and a main memory section for storing instructions for the processes, etc.

(First Embodiment)

Figure 3:
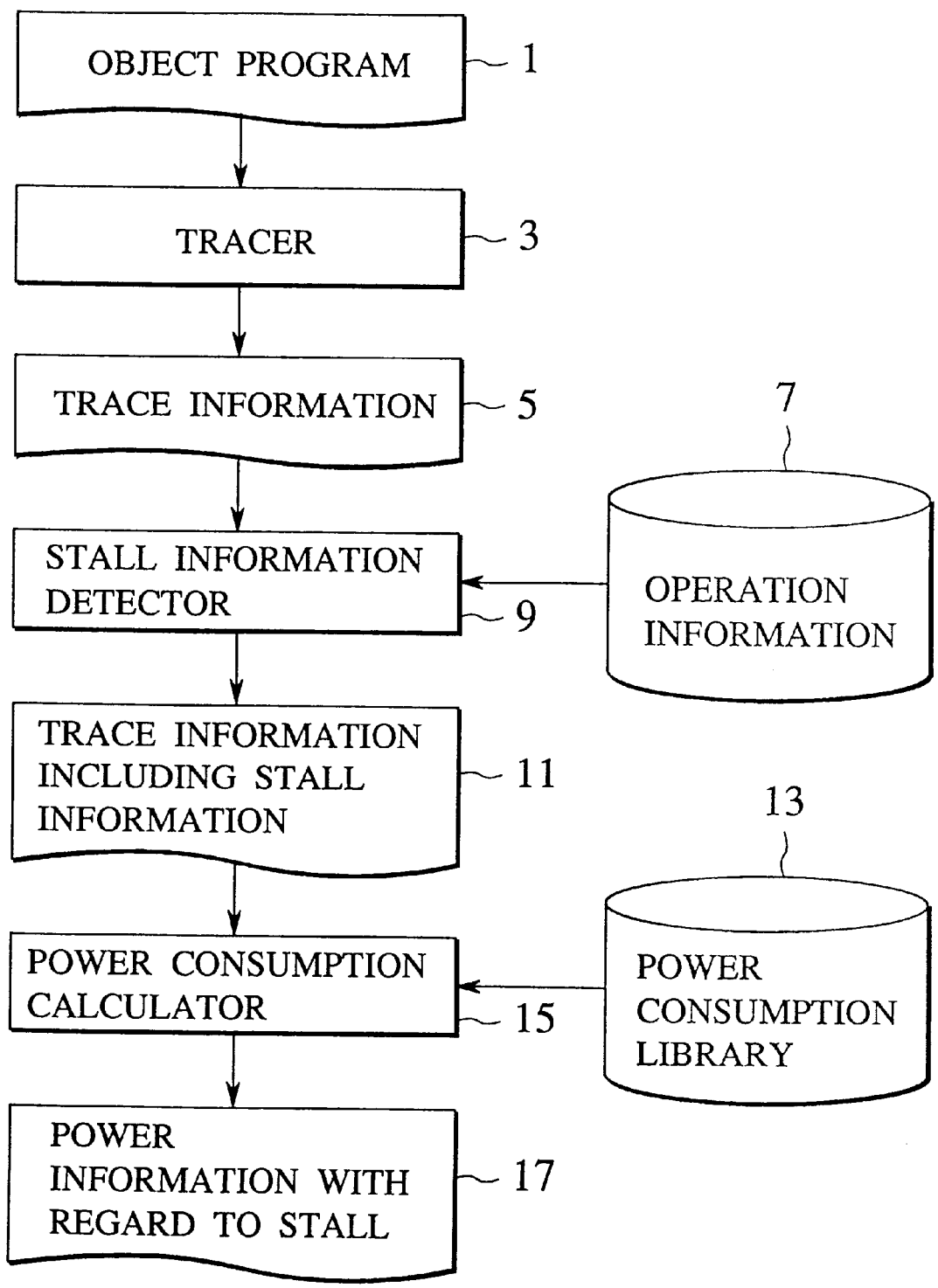
FIG. 3 is a block diagram showing a configuration of a power simulation system according to a first embodiment of the present invention.

FIG. 3 is a block diagram showing a configuration of a power simulation system according to a first embodiment of the present invention. This power simulation system comprises a tracer 3 for receiving instruction sequence of an object program 1 and then generating trace information 5 of the instruction sequence of the object program 1, a stall information detector 9 for receiving the trace information 5 generated by the tracer 3 and then detecting trace information 11 including stall information of the object program by use of microprocessor operation information 7, and a power consumption calculator 15 for calculating power information 17 with regard to the stall information as a consumption power value of the object program based on a power consumption library 13 with regard to the stall information by use of the trace information 11 including the stall information detected by the stall information detector 9.

An operation of the power simulation system according to the first embodiment of the present invention will be explained in detail with reference to FIGS. 4 to 11 hereunder.

Figure 4:
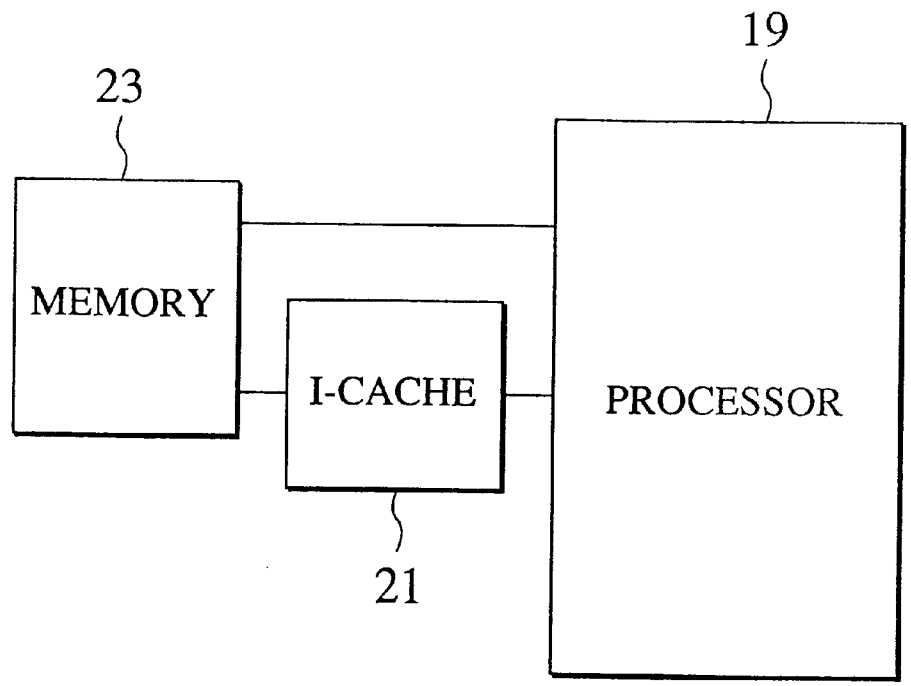
FIG. 4 is a schematic block diagram showing a configuration of a computer system for use in the power simulation system according to the first embodiment of the present invention.

A configuration of a computer system to execute the object program is shown in FIG. 4. The computer system comprises a processor 19 for executing the predetermined object program, a memory 23 for storing the predetermined object program, and an instruction cache (I-cache) 21 for storing a part of the predetermined object program.

The memory 23 is provided to store the instructions and data and is in general made up of a low speed, large capacity, and low cost memory. The instruction cache 21 is in general made up of a high speed, small capacity, and high cost memory. In the first embodiment, for convenience of following explanation, it is supposed that the instruction cache 21 can store 9 instructions at the same time and such an algorithm is employed in the instruction cache 21 that can erase the instruction from the oldest executed one if overflow occurs. The computer system can execute five types of instructions, i.e., load instruction used to load data, store instruction used to write data into the memory, add instruction used to add two register values, mult instruction used to multiply two register values, and bne instruction used to change the execution sequence into a designated instruction address when two register values are different from each other.

In addition, all instructions executed on the computer system are at first stored into the memory 23 in sequence aligned in the program irrespective of loop and branch. The sequence is given by successive instruction addresses. These instructions are stored in the instruction cache 21 once they have been executed.

Figure 5:
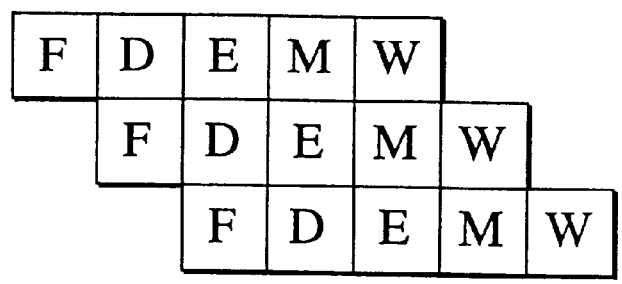
FIG. 5 is a view showing pipeline process executed by the computer system for use in the power simulation system according to the first embodiment of the present invention.

FIG. 5 is a view showing pipeline process executed by the computer system for use in the power simulation system according to the first embodiment of the present invention. In the first embodiment, power simulation concerning the computer system using a processor which executes five-stage pipeline control consisting of fetch (F), decode (D), execution (E), memory access (M), and write back (W) will be executed.

Assume that situations to cause the stall in these instructions are that such instructions are read out from the memory but such instructions are not read out from the cache. In addition, assume that the bne instruction is generated upon change in the execution sequence of the instructions other than the above.

Under these conditions, if the consumption power values consumed in all states of these instructions are prepared as library data, a power consumption library 13 with regard to the stall information is shown in FIG. 6. As shown in FIG. 6, since the power consumption is calculated by use of plural power consumption values every instruction according to whether or not the processor is put into the stall, the power simulation result can be derived more precisely.

The object program to be executed in the computer system as stated above is shown in FIG. 7. Procedures to calculate the power consumption value required for executing the object program by means of the power simulation system according to the first embodiment of the present invention will be explained along with FIG. 3 hereunder.

First of all, by executing and developing an instruction sequence of the object program 1 shown in FIG. 7 one by one while changing the data actually, the trace information 5 without regard to the stall information indicating by which sequence these instruction sequences are executed (referred to as "execution sequence" hereinafter) can be calculated. Such trace information 5 are shown in FIG. 8. In this example, it can be understood that, since a loop is generated by the bne instruction assigned to the instruction address 8, the instructions assigned from the instruction address 6 to the instruction address 8 are executed thrice repeatedly so that the number of instruction execution of the object program is 16 instructions.

Figure 9:
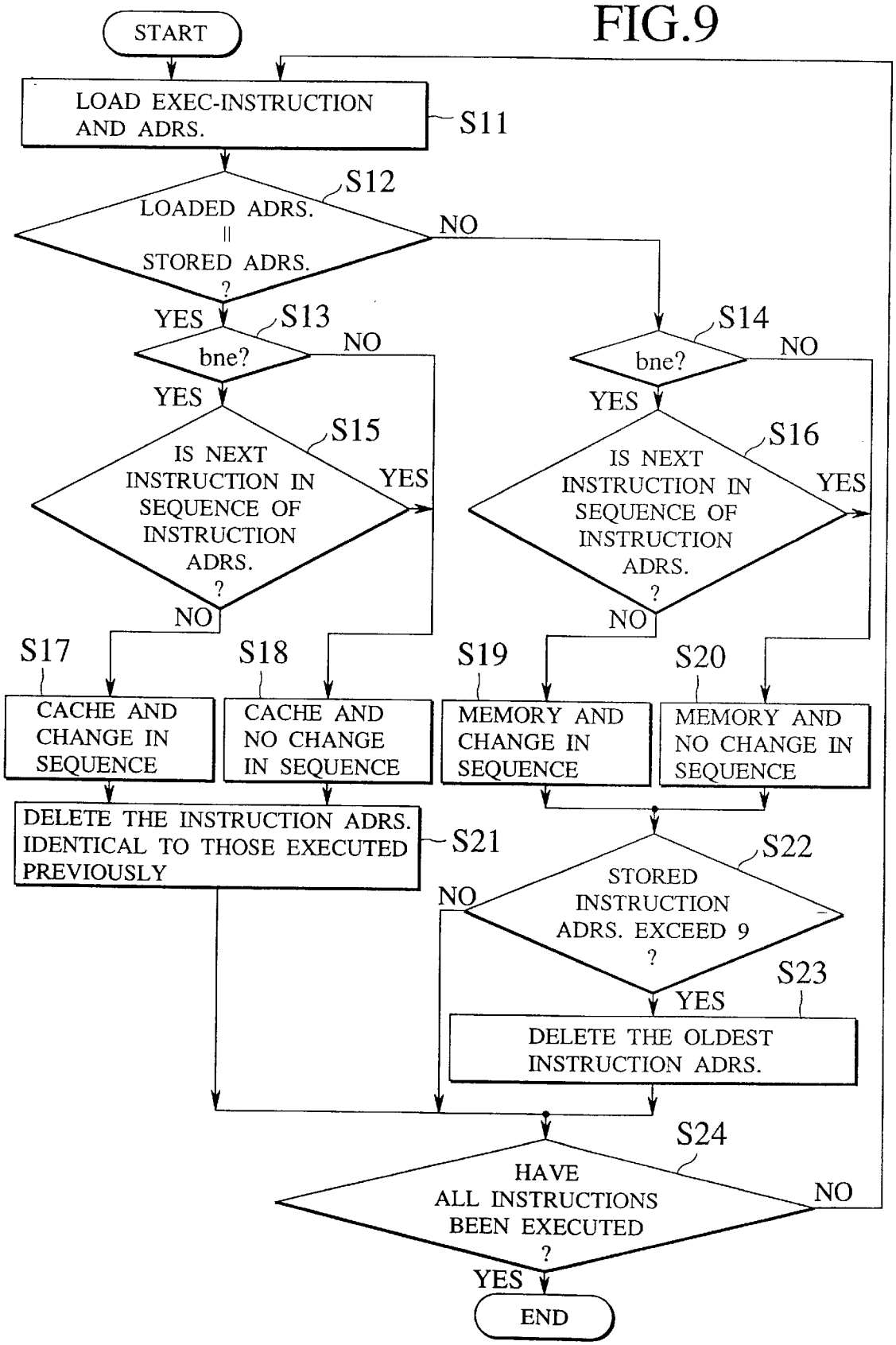
FIG. 9 is a flowchart illustrating a stall information detecting algorithm for use in the power simulation system according to the first embodiment of the present invention.

Next, stall information are added to the trace information by use of the microprocessor operation information 7 of the object program 1 in compliance with a stall information detecting algorithm. An example of the stall information detecting algorithm is shown in FIG. 9.

According to this stall information detecting algorithm, first one of the instructions to be executed is loaded from the instructions of the object program, and then a kind and an instruction address of the execution instruction is stored (step S11).

In turn, it is checked whether or not the instruction address of the instruction is equal to the instruction address stored in the instruction cache 21 (step S12). If NO, it has been found that this instruction has been loaded from the memory 23. On the contrary, if YES, it has been found that this instruction is such an instruction that has been executed previously once and thus stored in the instruction cache 21.

In addition, it is checked whether or not the kind of the execution instruction is bne (steps S13, S14). This is because a case may be considered where change in execution sequence of the instruction occurs if such instruction is the bne instruction. If YES, then the instruction address of the execution instruction is referred to. This is because the presence of change in the execution sequence of the instruction can be determined according to the succession of instruction addresses when the instruction address of currently executed instruction is compared with the instruction address of next executed instruction. As a result, according to the bne instruction, it can be determined whether or not the instruction sequence is changed.

Steps 15 to 20 in FIG. 9 executed next will be described later with reference to FIG. 8.

Finally, in FIG. 9, in order to distinguish only 9 instructions stored in the instruction cache 21 from other instructions, if the object instruction is loaded from the instruction cache 21, the instruction sequence stored in the instruction cache 21 is packed by deleting the instruction address of the instruction which has been previously executed and a new instruction address is added to the end of the stored instruction address (step S21). If the object instruction is loaded from the memory 23, this instruction is added to the end of the address sequence because such instruction is stored newly in the instruction cache 21. At this time, if the number of the instruction address stored in the memory 23 is in excess of 9 (step S22), the oldest instruction address is deleted (step S23) and then the process goes to step S24.

In this fashion, since all instructions have not been executed (step S24), the processes are executed repeatedly until all instructions in the object program to be executed by the processor have been executed in compliance with the algorithm shown in FIG. 9.

Then, it will be explained in detail how the trace information 5 shown in FIG. 8 are processed (steps 15 to 20 in FIG. 9). In an example of the trace information, with respect to seven initial instructions in the execution sequences 1 to 7 shown in FIG. 8, since their instruction addresses are not equal to the instruction addresses of all instructions which have been previously executed (step S12), the process goes to step S14. Then, since such seven instructions are not the bne instruction (step S14), the process goes to step S20. The memory 23 is accessed and the execution sequence of the instruction is not changed (step S20). Then, since the number of the instruction address stored in the memory 23 is less than 9 (step S22), the process goes to step S24. Since all instructions have not been executed (step S24), the process returns to step S11.

Then, the instruction in the execution sequence 8 shown in FIG. 8 and to be executed goes to step S14, like the above instructions. But such instruction is the bne instruction (step S14), then the process goes to step S16. Then, since next instruction in the execution sequence 9 is not in sequence of instruction address (i.e., the instruction addresses of the bne instruction is 8 but the instruction address of the mult instruction is 6) (step S16), the process goes to step S19. The memory 23 is accessed and the execution sequence of the instruction is changed (step S19). Since the number of the instruction address stored in the memory 23 does not exceed 20 like the above instruction (step S22), the process goes to step S24. Since all instructions have not been executed (step S24), the process returns to step S11.

Then, as for the instruction in the execution sequence 10 shown in FIG. 8, since its instruction address (i.e., 7) is equal to the instruction address stored in the instruction cache 21 (step S12), the process goes to step S13. Since the instruction is not the bne instruction (step S13), the process goes to step S18. The instruction cache 21 is accessed and the execution sequence of the instruction is not changed (step S18). Then, the instruction sequence stored in the instruction cache 21 is packed by deleting the instruction address of the instruction which has been previously executed and an instruction address is added newly to the end of the stored instruction address (step S21).

Since the instruction address of the instruction in the execution sequence 11 shown in FIG. 8 is also equal to the instruction address stored in the instruction cache 21 (step S12), the process goes to step S13. Then, the instruction is the bne instruction, unlike the instructions in the execution sequences 9, 10 (step S13) and therefore the process goes to step S15. It is checked whether or not the execution sequence of the instruction is changed (step S15). In this case, the next instruction in the execution sequence 12 is not in sequence of instruction address (i.e., the instruction addresses of the bne instruction is 8 but the instruction address of the mult instruction is 6), the process goes to step S17. The cache 21 is accessed and the execution sequence of the instruction is changed (step S17). Succeeding processes are identical to those of the instruction in the execution sequence 10.

The instructions in the execution sequences 12, 13 shown in FIG. 8 are subject to the same processes of the instruction in the execution sequence 9. In addition, like the instruction in the execution sequence 11, the process of the instruction in the execution sequence 14 also proceeds to step S15. Then, when the instruction address of next instruction is compared with that of the instruction in the execution sequence 14, the next instruction in the execution sequence 15 is in sequence of instruction address (step S15). Hence, the process goes to step S18. Succeeding processes are identical to those of the instruction in the execution sequence 11.

Since the instruction in the execution sequence 15 shown in FIG. 8 is executed for the first time (step S12), the process goes to step S14. Since the instruction in the execution sequence 15 is not the bne instruction (step S14), the process goes to steps S20, S22, and S24.

The instruction in the execution sequence 16 shown in FIG. 8 is executed for the first time (step S12), the process goes to step S14. the instruction in the execution sequence 16 is not the bne instruction (step S14), the process goes to steps S20. Since the stored instruction address exceed 9 (step S22), Hence, the process goes to step S23, and the oldest instruction address is deleted (step S23).

When the instruction in the execution sequence 16 has been completed, it is checked whether or not the instruction to be executed next is present, in order to determine whether or not all object instructions have been executed (step S24). Since there is no instruction to be executed subsequently, it has been found that all instructions have been executed. As a result, operations of the stall information detector 9 in FIG. 3 in compliance with the above algorithm have been terminated.

If results of the operation to add stall information to trace information are summarized, trace information 11 with regard to stall information, in which respective instructions and their execution conditions are correlated with each other, can be derived as shown in FIG. 10.

Referring to the executed instruction in the trace information 11 shown in FIG. 10, the information indicating whether or not the instructions are loaded from the instruction cache 21 or the memory 23 and also the information indicating whether or not the execution sequence of the instructions is changed, and the power consumption library 13 with regard to stall which is shown in FIG. 6 and prepared previously for such instructions, the power consumption calculator 15 in FIG. 3 can calculate power consumption values required for respective instructions. For instance, if the memory 23 is accessed by the load instruction, the power consumption value is 1600 mW. As a consequence, power information with regard to stall information as shown in FIG. 11 can be derived.

Using these results, a total power consumption value 17 of overall instructions of the object program can be derived finally by adding power consumption values consumed for respective instructions. In FIG. 11, the total power consumption value is given as 20600 mW. An average power consumption value can be obtained by dividing the total power consumption value by the number of instructions. Since the number of instructions is 18 in the first embodiment, the average power consumption value becomes about 1144.4 mW.

With the use of the power simulation system at such instruction level, high precision simulation results can be obtained. Since operations required for the simulation can be executed at high speed, it is facilitated that the most suitable program can be selected from plural programs to implement the same operation and also the program can be corrected while executing simulation.

(Second Embodiment)

Figure 12:
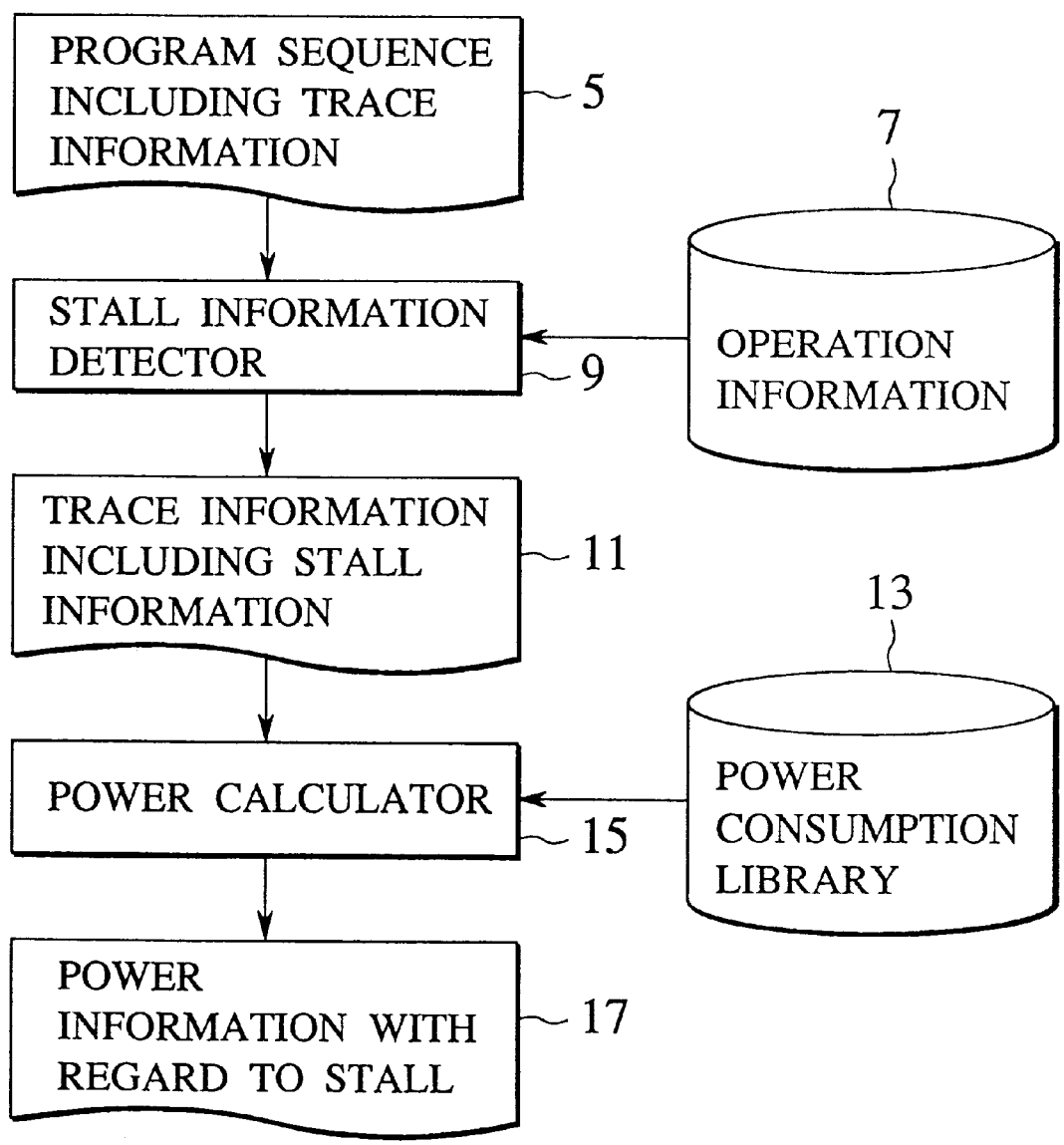
FIG. 12 is a block diagram showing a configuration of a power simulation system according to a second embodiment of the present invention.

FIG. 12 is a block diagram showing a configuration of a power simulation system according to a second embodiment of the present invention. The power simulation system comprises a stall information detector 9 for receiving a program sequence 5 including trace information and then detecting trace information 11 including stall information of the object program, and a power consumption calculator 15 for calculating power information 17 with regard to the stall information as a power consumption value of the object program based on a power consumption library 13 with regard to the stall information, with the use of the trace information 11 including stall information detected by the stall information detector 9.

Sometimes the program sequence 5 including the trace information, for example, can be obtained by another compiler, etc. In such case, power consumption may be calculated by detecting the stall information by using the program sequence including the trace information obtained. Since operations of the stall information detector 9 and the power consumption calculator 15 are similar to that in the first embodiment, their explanations will be omitted.

(Third Embodiment)

Next, a third embodiment of the present invention will be explained in detail with reference to FIGS. 13 to 27 hereinafter.

Figure 13:
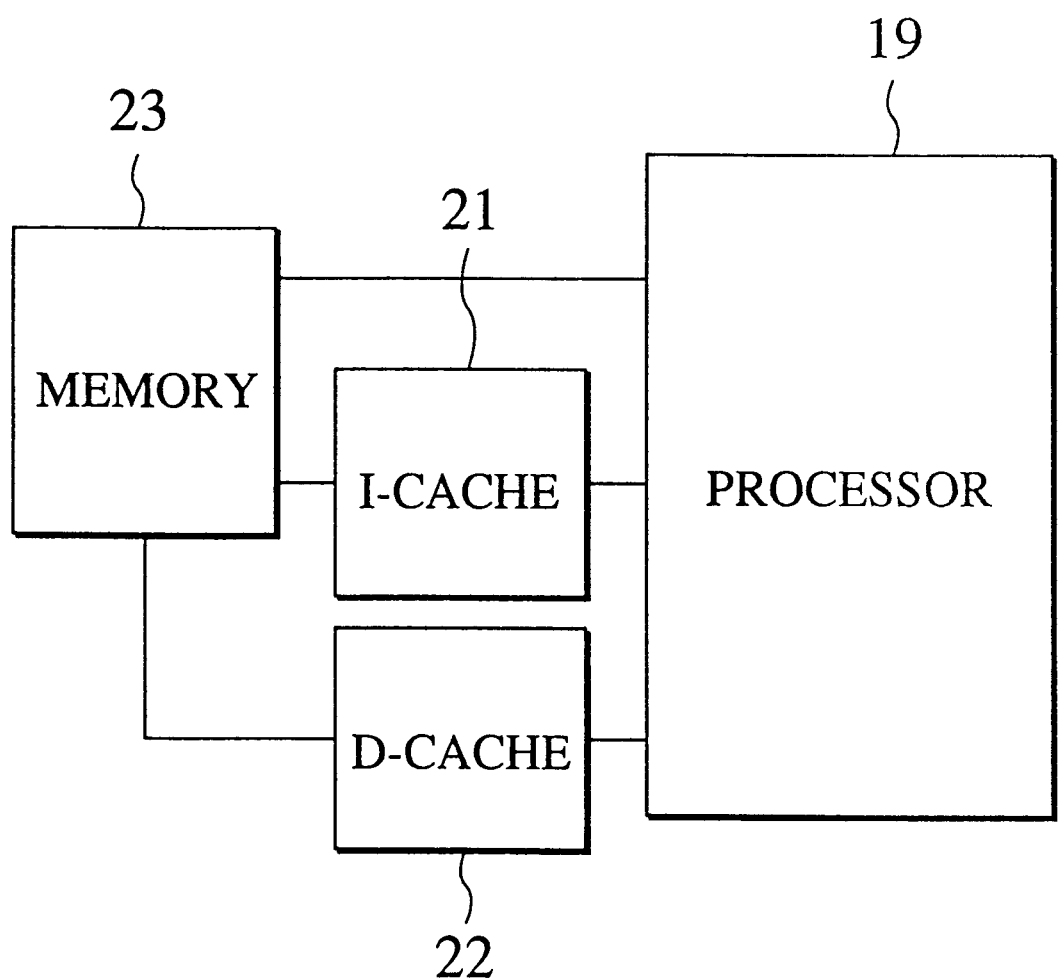
FIG. 13 is a schematic block diagram showing a configuration of a processor for use in a power simulation system according to a third embodiment of the present invention, wherein the same power simulation system as that according to the first embodiment of the present invention is employed in the third embodiment of the present invention.

A configuration of a computer system as a power simulation system according to the third embodiment of the present invention to execute the object program is shown in FIG. 13. The computer system comprises a processor 19 for executing the object program, a memory 23 for storing predetermined object program, an instruction cache 21 for storing a part of the predetermined object program, and a data cache (D-cache) 22 for storing a part of data for use in the object program.

The memory 23 is provided to store the instructions and data and is in general made up of a low speed, large capacity, and low cost memory. The instruction cache 21 and the data cache 22 are in general made up of a high speed, small capacity, and high cost memory rather than the memory 23. In the third embodiment, for convenience of following explanation, it is supposed that the instruction cache 21 can store 7 instructions at the same time and such an algorithm is employed in the instruction cache 21 that can erase the instruction from the oldest executed one if overflow occurs.

Instructions to be executed by the processor will be explained., the load instruction used to load data included in data address which can be obtained by adding a described numerical value to a reference data address (assume uniquely that the reference data address as Data Start and register 30 (abbreviated as "r30" hereinafter) in the third embodiment), the add instruction used to add two register values, the mult instruction used to multiply two register values, and the bne instruction used to change the execution sequence into a designated instruction address inasmuch as two register values are different from each other.

In addition, all instructions executed on the processor are at first stored into the memory 23 in sequence aligned in the program irrespective of loop and branch. The sequence is given by successive instruction addresses. These instructions are stored in the instruction cache 21 in order of the execution once they have been executed.

In order to improve a loading speed when the execution instruction is loaded from the memory 23, it is supposed that, if the instruction having the odd-numbered instruction address is executed, preloading of the next instruction is started together with loading of such instruction before execution of the next instruction is defined.

However, it is supposed that the instruction which is loaded at the same time when the instruction having the odd-numbered instruction address is the bne instruction is the instruction having the succeeding instruction address. In this case, it is supposed that, if the execution sequence of the instruction is changed according to the bne instruction, a new instruction is loaded once again after the preloaded instruction has been loaded.

In addition, it is supposed that one more cycle is needed to write a value being calculated by the instruction into a designated register and that the add instruction and the mult instruction cannot be executed unless two register values used as inputs have been defined. Further, it is supposed that only one multiplier is necessary for the mult instruction and that extra execution cycles are needed only when the mult instruction is executed successively.

It is supposed that these instructions are put into stall only when (1) the instruction is loaded from the memory, (2) data is loaded from the memory, (3) the add instruction and the mult instruction which use the execution result of the previous instruction as an input are executed, (4) the execution sequence of the instruction is changed because of the bne instruction when the bne instruction is loaded from the memory and has the odd-numbered instruction address, and (5) the mult instruction is executed continuously.

Power consumption library data consumed for all states of respective instructions used in the present invention are prepared as shown in FIGS. 14 to 18.

FIG. 14 is a table showing an example of power consumption library data for load instruction for use in the power simulation system according to the third embodiment. As shown in FIG. 14, four power consumption values are prepared for the load instruction as library data. More particularly, if the load instruction is accessed from the memory 23, data is accessed from either the memory 23 or the data cache 22. Also, if the load instruction is accessed from the instruction cache 21, data is accessed from either the memory 23 or the data cache 22.

FIG. 15 is a table showing an example of power consumption library data for add instruction for use in the power simulation system according to the third embodiment. As shown in FIG. 15, four power consumption values are prepared for the add instruction as library data. More particularly, if the add instruction is accessed from the memory 23, there is data-dependent stall or there is no data-dependent stall. Also, if the add instruction is accessed from the instruction cache 21, there is data-dependent stall or there is no data-dependent stall.

FIG. 16 is a table showing an example of power consumption library data for bne instruction for use in the power simulation system according to the third embodiment. As shown in FIG. 16, three power consumption values are prepared for the bne instruction as library data. More particularly, there are three cases where the bne instruction is accessed from the memory 23 and stall is caused by change in the execution sequence of the instruction, where the bne instruction is accessed from the memory 23, and the bne instruction is accessed from the instruction cache 21.

FIG. 17 is a table showing an example of power consumption library data for mult instruction for use in the power simulation system according to the third embodiment. As shown in FIG. 17, four power consumption values are prepared for the mult instruction as library data. More particularly, if the mult instruction is accessed from the memory 23, there is resource conflict or there is no resource conflict. Also, if the mult instruction is accessed from the instruction cache 21, there is resource conflict or there is no resource conflict. In addition, as shown in FIG. 18, an increased power consumption corrected value caused by resource conflict in the mult instruction (=150 mW) is prepared as the a power consumption library data.

Like the above, since power consumption can be calculated every instruction, with the use of plural power consumption values, according to whether or not the processor is put into stall, more precise results of the power simulation can be derived.

Power consumption values required when the program shown in FIG. 19 is executed by the above computer system will be explained in compliance with procedures in the third embodiment by use of FIG. 3 being used in the first embodiment.

An instruction sequence in the object program as shown in FIG. 19 is executed one by one while changing data actually. According to such execution, by referring to the operation information 7 of the object processor, the stall information detector 9 can detect in which sequence (referred to as "execution sequence" hereinafter) this instruction sequence is executed and what stall is generated by such instructions which have been executed in such execution sequence. The trace information 11 including the stall information, i.e., instruction execution information 11 to which information concerning detected stall (i.e., stall information) is added can be detected.

In this example, a loop is generated by the bne instruction of the instruction address 9 and therefore the instructions from the instruction addresses 4 to 9 are executed twice repeatedly. Therefore, it is understood that the number of instruction execution of the program is 18. The trace information of this case is shown in FIG. 20.

Figure 21:
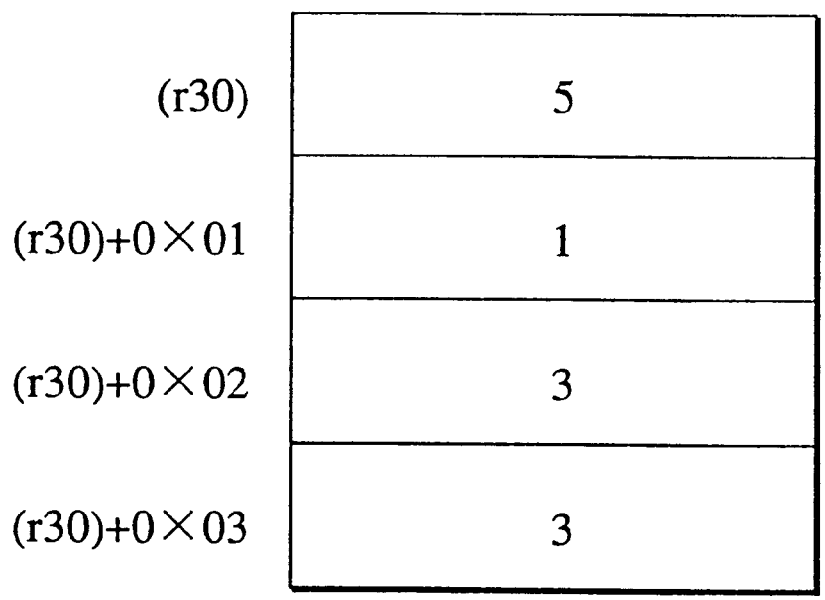
FIG. 21 is a view showing data alignment for use in the power simulation system according to the third embodiment of the present invention.

Although detailed explanations of respective instruction sequence of the object program shown in FIG. 9 are omitted, data are aligned as shown in FIG. 21 such that "5" is stored into the address which is stored into a reference data address r30, "1" is stored into the next address, "3" is stored into the further next address, and the like.

Figure 22:
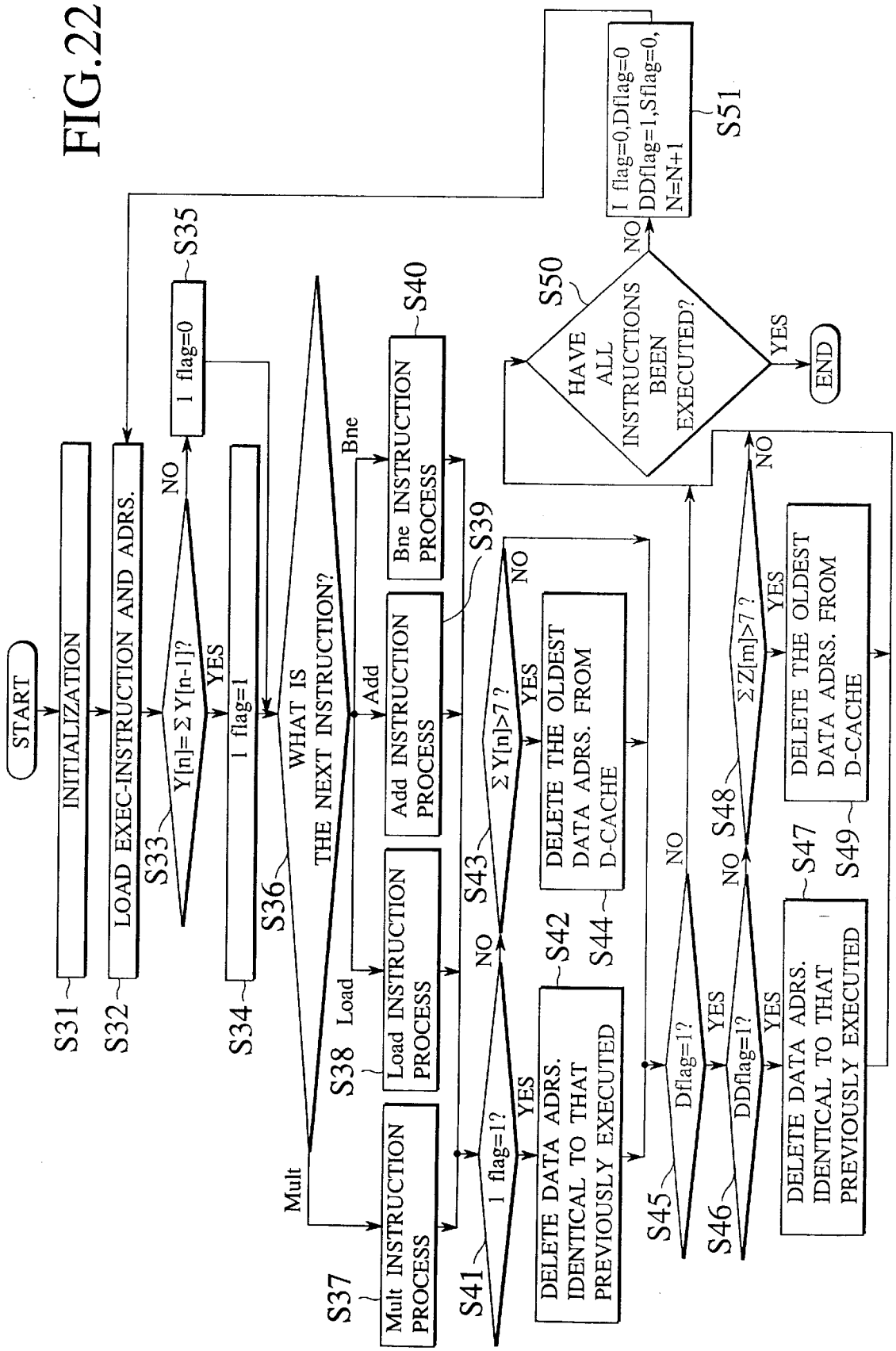
FIG. 22 is a flowchart illustrating a stall information detecting algorithm for use in the power simulation system according to the third embodiment of the present invention.

FIG. 22 is a flowchart illustrating an operation of the stall information detector 9, i.e., a stall information detecting algorithm for use in the power simulation system according to the third embodiment of the present invention. According to this algorithm, initialization is first executed (step S31), and then one instruction to be executed is loaded from the object instruction program and the kind and the instruction address of the instruction to be executed are stored (step S32).

Then, it is checked whether or not the instruction address of the instruction to be executed is equal to that stored in the instruction cache 21 (step S33). If YES, then the instruction is loaded from the instruction cache 21 and then executed and thus a flag is set (Iflag=1) (step S34). If NO, then the instruction is loaded from the memory 23 and then executed and thus the flag is not set (Iflag=0) (step S35). After this, it is determined what is the instruction to be executed subsequently (step S36).

Figure 23:
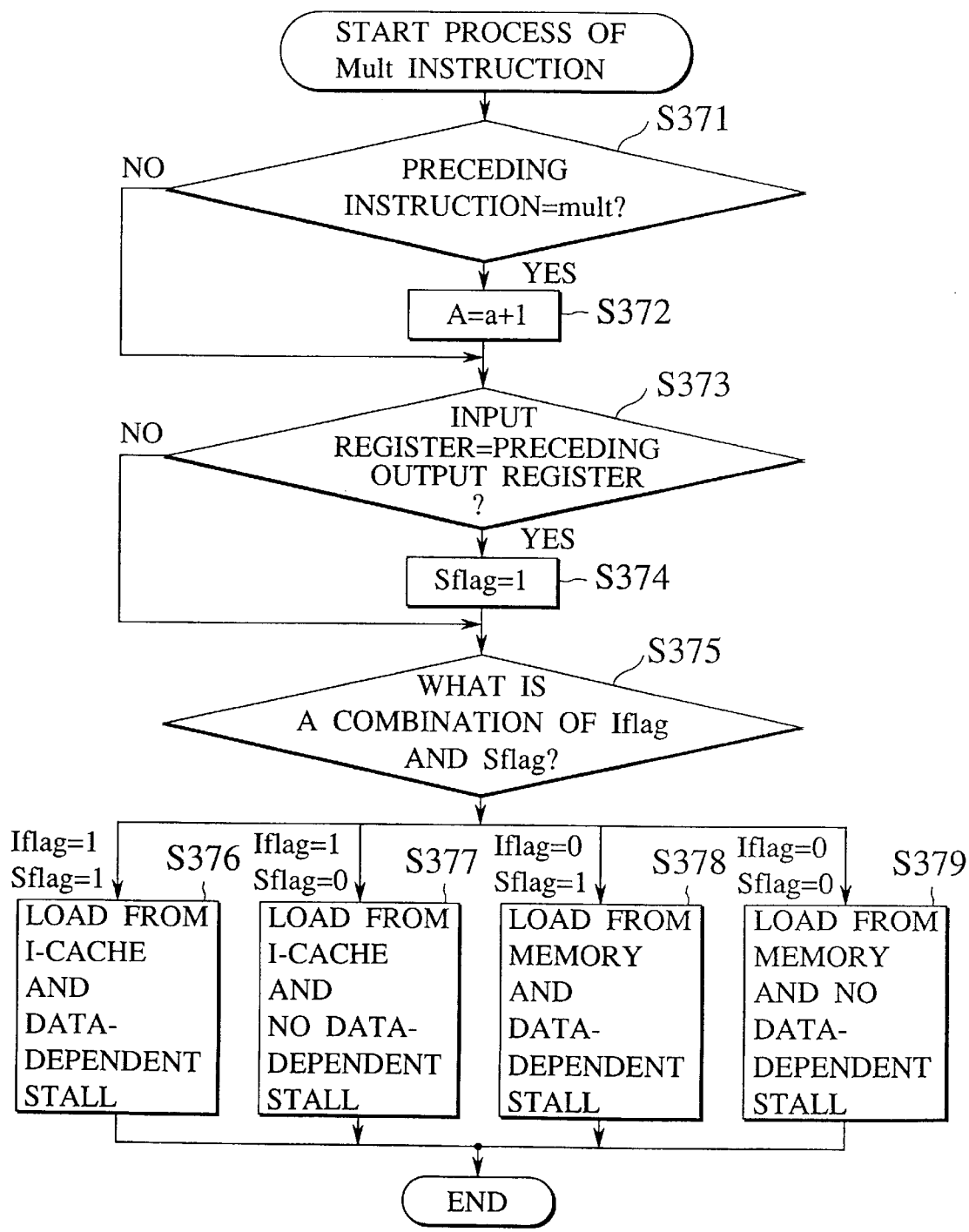
FIG. 23 is a flowchart illustrating an algorithm in Mult instruction process in FIG. 22.

The process carried out if the instruction to be executed is the mult instruction (step S37 in FIG. 22) is shown in FIG. 23. At first, it is checked whether or not the preceding instruction is the mult instruction (step S317). If the preceding instruction is the mult instruction, then a counter (A) is incremented by 1 to maintain the number of stall occurrence since stall due to resource conflict is caused (step S372).

Then, it is checked whether or not the register which receives this time instruction is the same as the register (output register) determined by the preceding instruction (step S373). If YES, then a flag (Sflag) is set (Sflag=1) because of generation of stall (step S374).

After the above examination, a combination of two flags of Iflag and Sflag is determined (step S375). The value of the corresponding counter of four types of counters with regard to state of the mult instruction executed this time is incremented by 1 (steps S376, S377, S378, S379).

Figure 24:
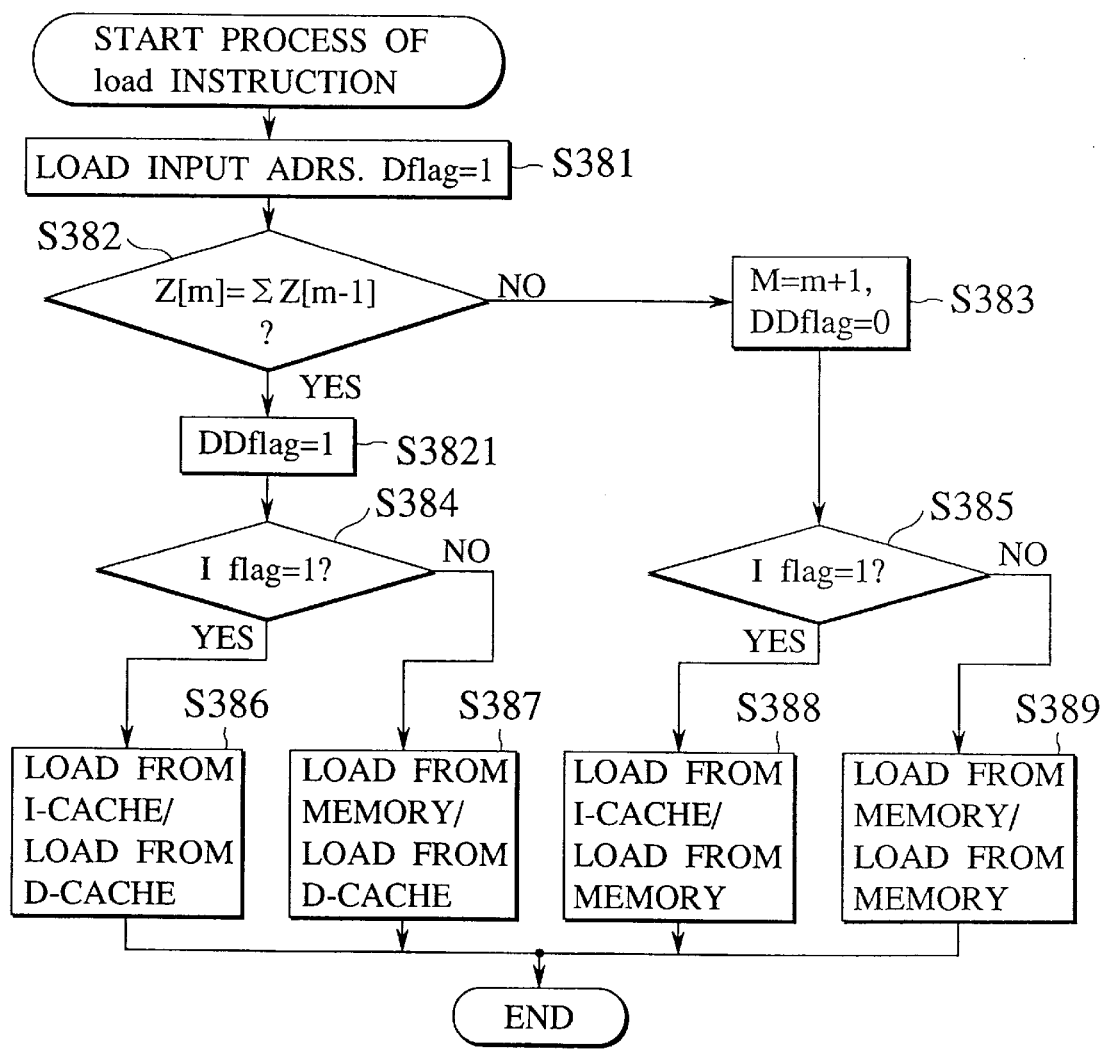
FIG. 24 is a flowchart illustrating an algorithm in Load instruction process in FIG. 22.

The process carried out if the instruction to be executed is the load instruction (step S38 in FIG. 22) is shown in FIG. 24. At first, the data address in which input data is stored is loaded, and then data load flag is set (Dflag=1) (step S381). Then, it is checked whether or not the data address is equal to that stored in the data cache 22 (step S382). If YES, it is recognized that the data is loaded from the data cache 22, and a flag (DDflag) is set (DDflag=1) since such data has been stored in the data cache 22 (step S3821). If NO, the flag (DDflag) is not set (DDflag=0) since the data is loaded from the memory 23, and it is newly recognized that the data has been stored in the data cache 22 (step S383). Then, it is determined about two causes, i.e., the data is loaded from either the memory 23 or the data cache 22 and the instruction is loaded from either the memory 23 or the instruction cache 21 (step S384, step S385). The value of the corresponding counter of four types (2□2) of counters prepared for the load instruction executed this time is incremented by 1 (steps S386, S387, S388, S389).

Figure 25:
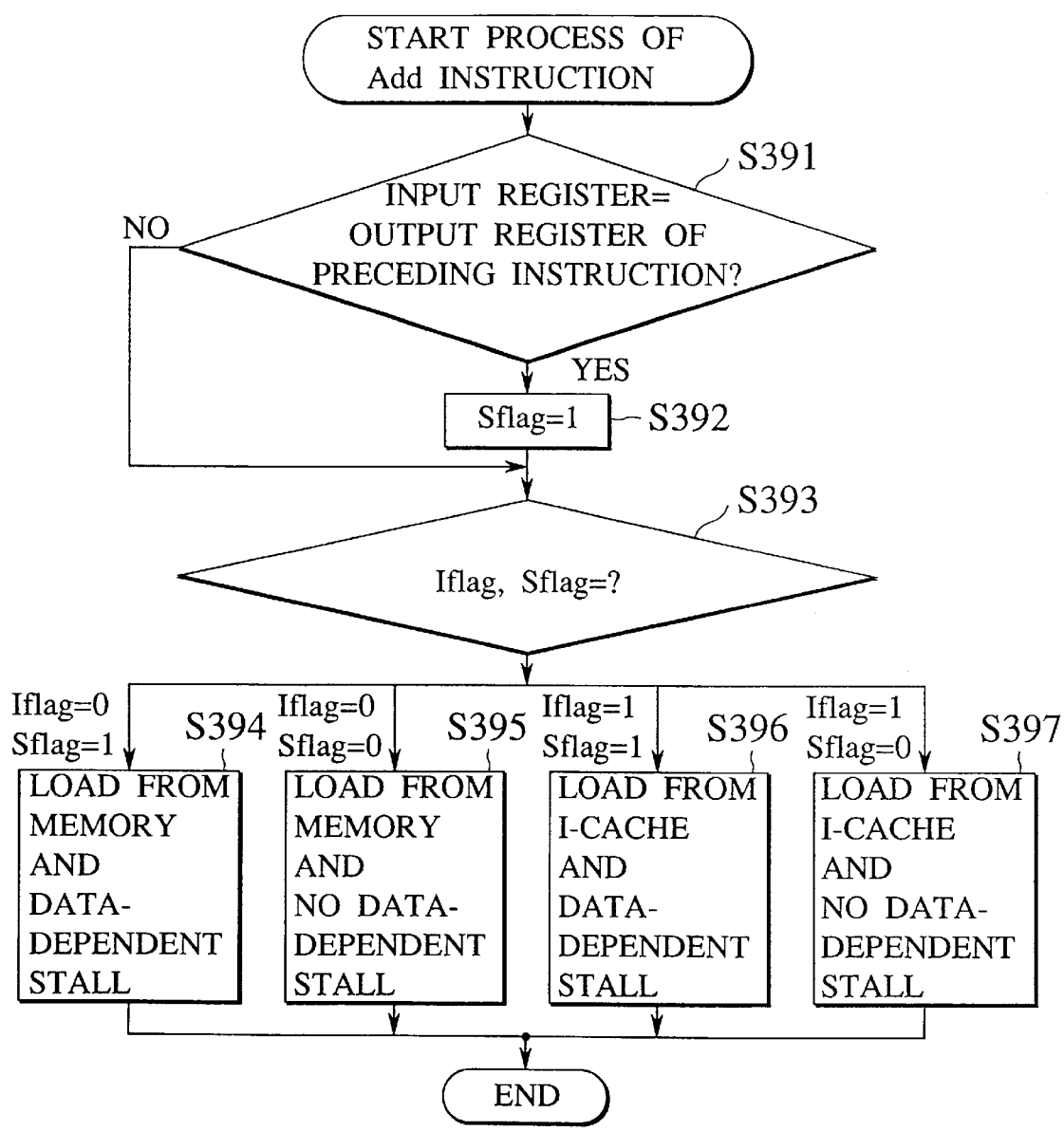
FIG. 25 is a flowchart illustrating an algorithm in Add instruction process in FIG. 22.

The process carried out if the instruction to be executed is the add instruction (step S39 in FIG. 22) is shown in FIG. 25. At first, it is checked whether or not the register to which this time instruction is input is identical to the register (output register) determined by the preceding instruction (step S391). If YES, a flag (Sflag) is set (Sflag=1) since the stall is generated (step S392).

According to the above examination, a combination of two flags of Iflag and Sflag is determined (step S393). The value of the corresponding counter of four types of counters with regard to state of the add instruction executed this time is incremented by 1 (steps S394, S395, S396, S397).

Figure 26:
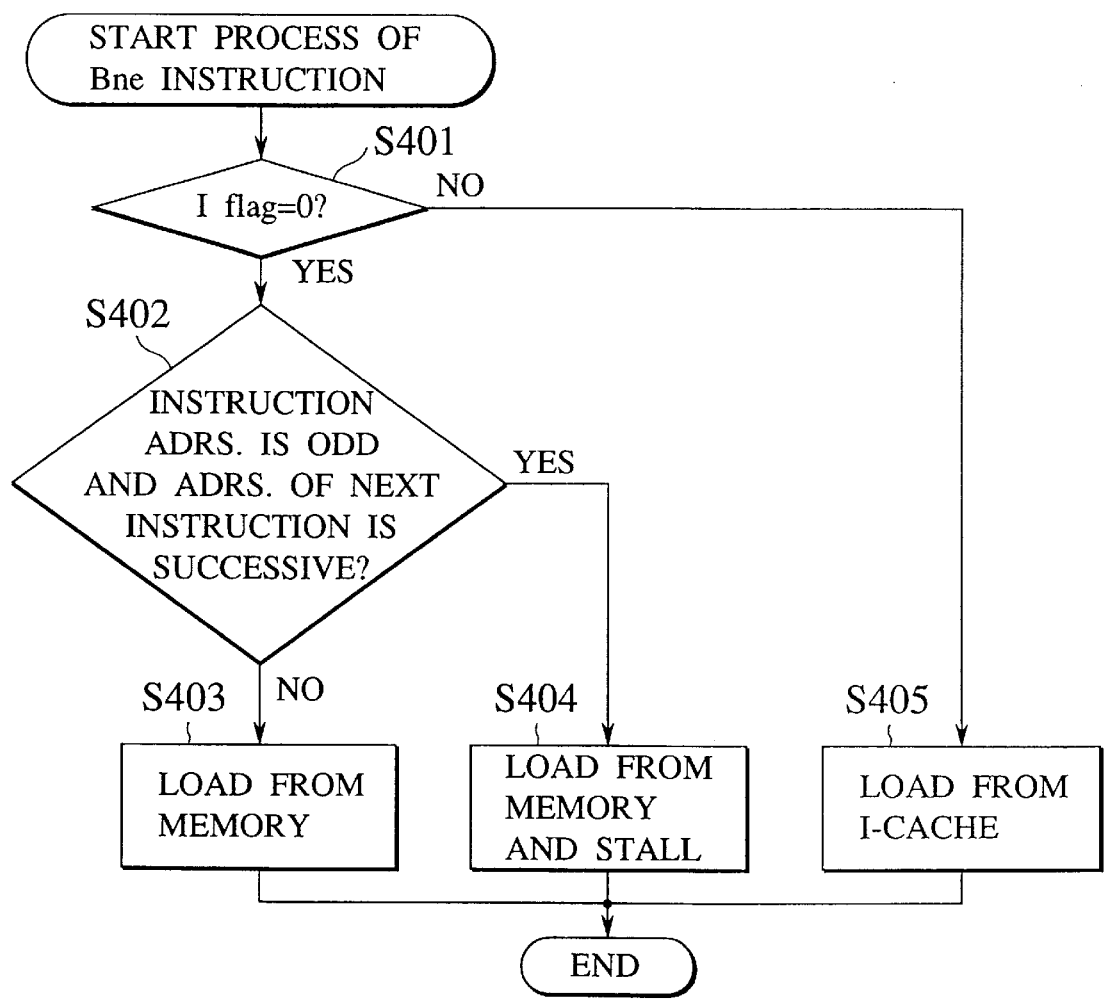
FIG. 26 is a flowchart illustrating an algorithm in Bne instruction process in FIG. 22.

The process carried out if the instruction to be executed is the bne instruction (step S40 in FIG. 22) is shown in FIG. 26. At first, it is checked whether or not the bne instruction is loaded from the memory 23 or the instruction cache 21 (step S401). If the bne instruction is loaded from the memory 23, then it is checked whether or not the instruction address of this instruction is odd and the instruction to be executed subsequently is in sequence of the instruction address of the bne instruction (step S402). With respect to the above three cases, the value of the corresponding counter of three types of counters being prepared is incremented by 1 (steps S403, S404, S405).

Returning to FIG. 22 once again, overflow of the data stored in the instruction cache 21 and the data cache 22 will be then checked after the instructions executed as above are classified into the executions with regard to states and added to respective execution frequencies. These situations will be explained with reference to FIG. 22 hereunder.

First, it is determined from which memory of the instruction cache 21 or the memory 23 this time instruction is loaded (step S41). If the instruction is loaded from the instruction cache 21, then the instruction address stored previously in the instruction cache 21 is deleted (step S42). On the contrary, if the instruction is loaded from the memory 23, then it is checked whether or not the number of stored instruction address is in excess of 7 since this time instruction is newly stored into the instruction cache 21 (step S43). If the number of stored instruction address exceeds 7, the oldest instruction address is deleted (step S44).

Next, it is determined whether or not the data is newly loaded into the register (step S45). If the data is newly loaded into the register, then it is determined whether the data is loaded from the memory 23 or the data cache 22 (step S46).

If the data is loaded from the data cache 22, then data stored previously in the data cache 22 is deleted (step S47). On the contrary, if the data is loaded from the memory 23, then it is checked whether or not the number of stored data address is more than 7 since this time loaded data is newly stored in the data cache 22 (step S48). If the number of stored data address exceeds 7, the oldest data address is deleted (step S49). If the data is loaded from the memory 23, no process is executed and the process goes to next process.

To the end, it is checked whether or not the algorithm processes of all instructions in the object program has been executed (step S50). If NO, the flag is initialized and then the program counter (N) is incremented by 1 (step S51). Then, the processes in steps S32 to S51 are repeated once again. If these processes have been completed, this algorithm is ended.

Next, as a concrete example of the third embodiment of the present invention, the case where the program shown in FIG. 20 is executed will be explained hereunder. In this example, first the process advances to steps S31, S32 to analyze the object program, and the load instruction in the instruction address 1 (execution sequence 1) is recognized (step S33). Since this instruction has the instruction address which has not been stored in the instruction cache 21, the process goes to step S35. Then, the instruction to be executed in step S36 is recognized (step S35). Since this instruction is the load instruction, the process goes to step S381. Then, it is checked whether or not data in the input data address has already been stored in the data cache 22 (step S382). Since data as for this load instruction has not been stored in the data cache 2, the flag (DDflag) is not set (DDflag=0) (step S383). Therefore, since the data is loaded from the memory 23, the process goes to step S41 in FIG. 22 via steps S385 to S389. Since the instruction is loaded from the memory 23 (step S41), the process goes to step S43. Then, since a total number of the instruction stored in the instruction cache 21 is not 7 (step S43), the process goes to step S45. Then, since use data is newly loaded into the register (step S45), the process goes to step S46. Then, the process goes to step S48 because the data is loaded from the memory 23 (step S46). Then, since the number of data stored in the data cache 22 is less than 7 (step S48), the process goes to step S50. Then, since the last instruction has not been executed yet (step S50), the process returns to step S32 again via step S51 so as to execute the subsequent instruction.

Then, since the instruction of the execution sequence 2 is the load instruction which is loaded from the memory 23, the process goes to step S382, like the load instruction of the instruction address 1. Then, since loaded data is the data which has already been loaded into the data cache 22 (step S382), the process goes to step S384. Then, since the instruction is loaded from the memory 23 (step S384), the process goes to step S41 in FIG. 22 via step S387. The process goes up to step S46 via the same route, but it branches at step S46 to step S47 and passes through steps S50, S51 and returns to step S32.

The instructions of the execution sequences 3, 4 proceed via the same routes as the load instruction of the execution sequence 1 and processed.

Then, the instruction of the execution sequence 5 is the add instruction which is loaded from the memory 23, and therefore it takes the same route as the instruction of the execution sequence 1 up to step S36 and branches at step S36 to step S39. Since the value of the register being output by the preceding instruction is received as input data (step S391), the process goes to step S393 via step S392. Then the process advances to step S394 (step S392). Then, the process goes to step S45 in FIG. 22 via steps S41, S43. Then, since this instruction does not load the data into the register (step S45), the process jumps directly to step S50 and returns to step S32 via step S51.

Then, the instruction of the execution sequence 6 is the mult instruction which is loaded from the memory 23, and thus the process goes to steps S36 and S37. Then, since the preceding instruction is not the mult instruction (step S371), the process jumps to step S373. Then, since the register which receives this instruction is the output register for the preceding instruction (step S373), the process proceeds to step S375 via step S374. Then, the process advances to step S377 according to the decision in step S375. The processes S378 and forth pass through the same route as the instruction of the execution sequence 5 and then returns to step S32.

Then, like the instruction of the execution sequence 6, the instruction of the execution sequence 7 is also the mult instruction which is loaded from the memory 23, the process goes up to step S371. However, since the preceding instruction is the mult instruction at this time (step S371), the process goes to step S373 via step S372. Since the input register is not the preceding output register (step 373), the process goes to step S375 and then classified into step S378. Step 378 and forth take the same route as the instruction of the execution sequence 6.

Then, since the instruction of the execution sequence 8 is the add instruction which is loaded from the memory 23, the process goes up to step S391, like the instruction of the execution sequence 5. Since the input register is not the preceding output register (step S391), the process goes to step S393. Then the process is classified to step 395 and then proceeds to step S41 in FIG. 22. Following steps advance via the same route as the instruction of the execution sequence 6.

Then, since the instruction of the execution sequence 9 is the bne instruction which is loaded from the memory 23, the process goes up to step S36, like the instruction of the execution sequence 1. Then, the process branches at step S36 to step S401. Since this instruction is loaded from the memory 23, the process goes to step S402. Then, since the execution sequence of this instruction is odd and thus is not in sequence of the instruction address of the instruction to be executed subsequently (step S402), the process goes to step S403. Following steps proceed via the same route as the instruction of the execution sequence 6.

Then, the instruction of the execution sequence 10 is the load instruction of the instruction address 4 again. Since this instruction has been stored in the instruction cache 21 (step S33), the process goes to step S36 via step S34. Then, the process takes the same route as the instruction of the execution sequence 4 from step S36 to step S382. Since the data to be used has already been stored in the data cache 22 (step S382), the process goes to step S384. Then, the process is classified into step S386 (step S384) and goes to step S41. Since it is determined affirmative (step S41), the process goes to step S45 via step S42. Following steps advance via the same route as the instruction of the execution sequence 6.

Then, since the instruction of the execution sequence 11 is the add instruction which has been executed once, like the instruction of the execution sequence 10, the process takes the same route as the instruction of the execution sequence 10 until step S36. Since this instruction is the add instruction (step S36), the process is classified to step S391 and then proceeds to step S393 via step S392, like the instruction of the execution sequence 5. Since the instruction is loaded from the instruction cache 21 and there is data-dependent stall (step S393), the process goes to step S396 and then step S41. Following steps proceed via the same route as the instruction of the execution sequence 10.

Then, the instruction of the execution sequence 12 takes the same route as the instruction of the execution sequence 10 up to step S36. Since this instruction is the mult instruction (step S36), the process advances to step S371 and then takes the same route as the instruction of the execution sequence 6 up to step S375. Since the instruction is loaded from the instruction cache 21 and there is data-dependent stall (step S375), the process goes to step S376 and then step S41. Step S41 and forth take via the same route as the instruction of the execution sequence 10.

Then, the instruction of the execution sequence 13 goes via the same route as the instruction of the execution sequence 12 up to step S371. Then, the process takes the same route as the instruction of the execution sequence 7 from step S371 to step S375. Since the instruction is loaded from the instruction cache 21 and there is no data-dependent stall (step S375), the process goes to step S377 and then step S41. Step S41 and forth take via the same route as the instruction of the execution sequence 10.

Then, the instruction of the execution sequence 14 goes via the same route as the instruction of the execution sequence 11 up to step S391. Then, the process goes to step S393, like the instruction of the execution sequence 8. Since the instruction is loaded from the instruction cache 21 and there is no data-dependent stall (step S393), the process goes to step S397 and then step S41. Step S41 and forth take via the same route as the instruction of the execution sequence 10.

Then, the instruction of the execution sequence 15 goes via the same route as the instruction of the execution sequence 10 up to step S36. Since this instruction is the bne instruction, the process goes to step S401. Since the instruction is loaded from the instruction cache 21 (step S401), the process goes to step S405 and then step S41. Step S41 and forth take via the same route as the instruction of the execution sequence 10.

Then, the instruction of the execution sequence 16 advances via the same route as the instruction of the execution sequence 2.

Then, the instruction of the execution sequence 17 goes via the same route as the instruction of the execution sequence 9 up to step S402. Since the instruction to be executed next is in sequence of the instruction address (step S402), the process advances to step S41 via step S403. Following steps proceed via the same route as the instruction of the execution sequence 9.

Then, the instruction of the execution sequence 18 goes to step S50 via steps S48, S49, and S50. Since this instruction is the last one in the object program (step S50), this algorithm is ended.

With the above, an operation to add the stall information to the trace information has been terminated. According to the output results, as shown in FIG. 27, power information in which the instruction program and states of respective instructions are correlated with each other can be derived.

Finally, a total power consumption value of overall instructions of the object program can be detected from the power information shown in FIG. 27 by summing up power consumption values of respective instructions by means of the power consumption calculator 15. And, an average power consumption value per instruction can be derived by dividing the total power consumption value of overall instructions of the object program by the number of executed instructions. In this manner, power consumption estimation results can be obtained by implementing the third embodiment of the present invention.

Likewise, in the power simulation system according to the third embodiment, power consumption values can be derived according to simulation by analyzing respective states where respective instructions are executed. Accordingly, higher precision simulation results can be achieved.

The program used for implementing the above power simulation can be stored in a recording medium. The above power simulation can be accomplished while controlling the computer when the above program is executed by causing the computer system to read the recording medium. Here various devices which can store the program such as memory device, magnetic disc drive, optical disc drive, etc. are included in the above recording medium.

Various modifications will become possible for those skilled in the art after receiving the teaching of the present disclosure without departing from the scope thereof.

As stated above, according to the power simulation system, the power simulation method, and the computer-readable recording medium for storing the power simulation program of the present invention, higher precision simulation results can be derived by executing simulation with regard to stall information of respective instructions rather than the simulation system using only the trace information of the object program, and also higher speed simulation results can be derived by the simulation system with respect to the inside of the processor.

According to the present invention, the instruction program executed by the processor can be prepared by studying and examining the processor in real time with considering low power consumption.

What is claimed is:

1. A power simulation system, operable on a computer, for simulating power consumption required when instructions included in an object program to be executed by a processor are executed, the power simulation system comprising:
   a stall information detector receiving the object program, and detecting trace information including stall information of the object program;
   a storing unit storing at least two power consumption values for each instruction according to whether or not the processor is put into a stall; and
   a calculator determining a final power consumption value consumed in the processor by use of the at least two power consumption values, said calculator outputting the final power consumption value as power information with regard to stall of the object program.

2. A power simulation system, operable on a computer, for simulating power consumption required when instructions included in an object program to be executed by a processor are executed, the power simulation system comprising:
   a tracer receiving the object program, and then generating trace information of the object program;
   a stall information detector receiving the trace information generated by the tracer, and then detecting stall information of the object program;
   a storing unit storing at least two power consumption values for each instruction according to whether or not the processor is put into a stall; and
   a power consumption calculator determining a final power consumption value required for the object program based on a power consumption library with regard to the stall information by use of the stall information detected by the stall information detector, said power consumption calculator outputting the final power consumption value as power information with regard to stall of the object program.

3. A power simulation system as claimed in claim 2, wherein the stall information detector receives the trace information generated by the tracer, and then detects the stall information of the object program by use of operation information of the processor which is subject to power simulation, the operation information being stored by a processor operation information storing unit.

4. A power simulation system as claimed in claim 2, wherein the power consumption calculator determines the final power consumption by use of library data of power consumption values which are prepared for all states which appear upon executing the object program.

5. A power simulation system, operable on a computer, for simulating power consumption in a computer system which includes, a processor for executing a predetermined object program, a memory for storing the predetermined object program, and an instruction cache for storing a part of the predetermined object program, the power simulation system comprising:

a tracer receiving the object program, and then generating trace information of the object program;

a stall information detector receiving the trace information generated by the tracer, and then detecting stall information including information indicating whether the object program is stored in the memory or the instruction cache; and a power consumption calculator determining a power consumption value required for the object program based on a power consumption library with regard to the stall information including consumption power when the object program is stored in the memory and consumption power when the object program is stored in the instruction cache, by use of the stall information detected by the stall information detector, said power consumption calculator outputting the power consumption value as power information with regard to stall of the object program.

6. A power simulation system as claimed in claim 5, wherein the stall information detector receives the trace information generated by the tracer, and then detects the stall information both including information indicating whether the object program is stored in the memory or the instruction cache and information indicating whether or not the object program is subject to change in instruction sequence.

7. A power simulation method, operable on a computer, for simulating power consumption required when instructions included in an object program to be executed by a processor are executed, the power simulation method comprising the steps of:

receiving the object program;

detecting trace information including stall information of the object program;

determining a final power consumption value consumed in the processor by use of at least two power consumption values for each instruction according to whether or not the processor is put into a stall; and outputting the final power consumption value as power information with regard to stall of the object program.

8. A power simulation method, operable on a computer, for simulating power consumption required when instructions included in an object program to be executed by a processor are executed, the power simulation method comprising the steps of:

receiving the object program, and then generating trace information of the object program;

receiving the trace information generated, and then detecting stall information of the object program;

determining a power consumption value required for the object program based on a power consumption library with regard to the stall information by use of the stall information detected, and outputting the power consumption value as power information with regard to stall of the object program.

9. A power simulation method as claimed in claim 8, wherein the step of detecting the stall information includes steps of receiving the trace information generated, and detecting the stall information of the object program by use of operation information of the processor which executes a power simulation.

10. A power simulation method as claimed in claim 8, wherein the step of determining the power consumption value includes a step of calculating power consumption by use of library data of power consumption values which are prepared for all states which appear upon executing the object program.

11. A power simulation method, operable on a computer, for simulating power consumption in a computer system which includes, a processor for executing a predetermined object program, a memory for storing the predetermined object program, and an instruction cache for storing a part of the predetermined object program, the power simulation method comprising the steps of:

receiving the object program, and then generating trace information of the object program;

receiving the trace information generated, and then detecting stall information including information indicating whether the object program is stored in the memory or the instruction cache;

determining a power consumption value required for the object program based on a power consumption library with regard to the stall information including consumption power when the object program is stored in the memory and consumption power when the object program is stored in the instruction cache, by use of the stall information detected, and outputting the power consumption value as power information with regard to stall of the object program.

12. A power simulation method as claimed in claim 11, wherein the step of detecting the stall information includes steps of receiving the trace information generated, and detecting the stall information including both information indicating whether the object program is stored in the memory or the instruction cache and information indicating whether or not the object program is subject to change in instruction sequence.

13. A power simulation method as claimed in claim 12, wherein the detecting stall information comprises the steps of:

receiving an instruction of the object program;

storing a type and an address of the instruction; and detecting a stall by determining whether or not the instruction address is equal to the address stored in the instruction cache.

14. A power simulation method as claimed in claim 13, further comprising the step of detecting change in instruction sequence by determining whether or not the type of instruction is the branch instruction.

15. A computer program product for, simulating power consumption value required when instructions included in an object program to be executed by a processor are executed, comprising the steps of:

receiving the object program;

detecting trace information including stall information of the object program;

determining a final power consumption value consumed in the processor by use of the at least two power consumption values for each instruction according to whether or not the processor is put into a stall; and outputting the final power consumption value as power information with regard to stall of the object program.

16. A computer program product for simulating power consumption value required when instructions included in an object program to be executed by a processor are executed, comprising the steps of:

receiving the object program;

detecting trace information including stall information of the object program;

receiving the object program and then generate trace information of the object program;

receiving the trace information generated;

detecting stall information of the object program;

determining a power consumption value required for the object program, based on a power consumption library with regard to the stall information by use of the stall information detected; and outputting the power consumption value as power information with regard to stall of the object program.

17. A computer program product as claimed in claim 16, wherein the receiving the trace information generated by the the detecting stall information of the object program by use of operation information of the processor which executes power simulation.

18. A computer program product as claimed in claim 16, wherein determining power consumption by use of library data of power consumption values which are prepared for all states which appear upon executing the object program.

19. A computer program product for simulating power consumption in a computer system which includes, a processor for executing a predetermined object program, a memory for storing the predetermined object program, and an instruction cache for storing a part of the predetermined object program, the computer-readable recording medium comprising the steps of:

receiving the object program;

generating trace information of the object program;

receiving the trace information generated;

detecting stall information including information indicating whether the object program is stored in the memory or the instruction cache;

determining a power consumption value required for the object program based on a power consumption library with regard to the stall information including consumption power when the object program is stored in the memory and consumption power when the object program is stored in the instruction cache, by use of the stall information detected, and outputting the power consumption value as power information with regard to stall of the object program.

20. A computer program product as claimed in claim 19, wherein the detecting stall information including both information indicating whether the object program is stored in the memory or the instruction cache and information indicating whether or not the object program is subject to change in instruction sequence.

* * * * *